(No Model.)
W. A. SHAW.
SECONDARY BATTERY.
No. 316,408. Patented Apr. 21, 1885.
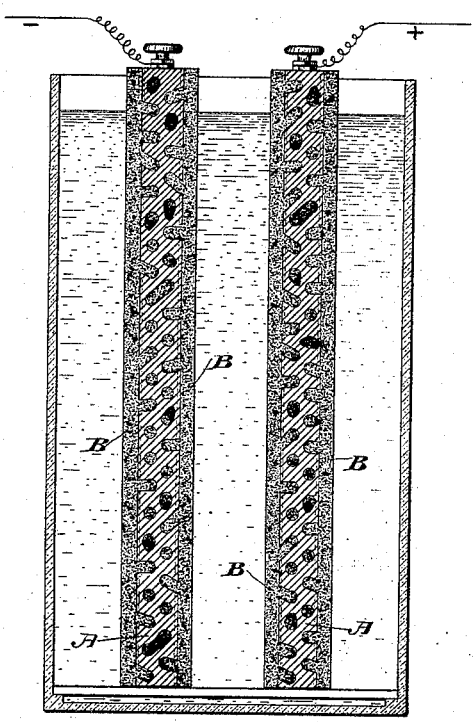
Attest:
Geo. T. Smallwood.
Philip Mauro
Inventor:
William Anthony Shaw
by A. Pollok
his attorney.

UNITED STATES PATENT OFFICE.

WILLIAM ANTHONY SHAW, OF PITTSBURG, PA., ASSIGNOR TO THE ELECTRICAL ACCUMULATOR COMPANY, OF NEW YORK, N. Y.

SECONDARY BATTERY.

SPECIFICATION forming part of Letters Patent No. 316,408, dated April 21, 1885.

Application filed June 25, 1883. (No model.)

*To all whom it may concern:*

Be it known that I, WILLIAM ANTHONY SHAW, of Pittsburg, in the county of Allegheny and State of Pennsylvania, (formerly of Brooklyn, Kings county, New York,) have invented a new and useful Improvement in Secondary Batteries, which improvement is fully set forth in the following specification.

This invention, although not wholly limited thereto, relates more particularly to that type of secondary or storage batteries in which, when charged, the electro-negative material or active material of the negative plate or negative element of a couple is a metallic oxide, (usually peroxide of lead.) The electro-positive material or active material of the positive plate or positive element of the couple is an oxidizable reduced metal, (usually lead,) and the electrolyte is a liquid in which the oxides existing in the battery or formed in the charge and discharge thereof are not soluble. The active material in both plates or elements is best made by combining a metallic oxide salt or compound adapted to be reduced or electrolyzed with the body support or frame of the plates or elements. The oxide salt or compound on the positive plate or element being electrolyzed, the reduced metal is left in a porous or spongy condition, which greatly facilitates its action in the battery. The oxide salt or compound on the negative plate or element is also brought by electrical action into proper condition for working; it may be by being first reduced to a metallic state and then oxidized. This operation of putting the plates or elements in working order is known as "forming." Prior to this operation the positive and negative plates or elements are or may be the same, although not, of course, necessarily so. The forming may take place before or after the plates or elements are assembled in a couple or couples, and need not be a separate operation.

The present invention comprises improvements in the manufacture of the plates or elements preparatory to forming or assembling in couples or cells.

The invention consists, first, in consolidating lead oxide to form the active material by heat and pressure; second, in uniting the active material to the supporting material or conducting support of a metal—such as lead—by heat and pressure; and, third, in uniting a compressed layer of active material to the supporting material or conducting support by pressure when the latter is heated.

With regard to this part of the invention, it may be observed that heretofore the negative elements of Leclanché cells have been made by consolidating in a mold by heat and pressure a mixture of manganese dioxide, granulated carbon, and resin or its equivalent. A carbon rod may be placed in the mass to be consolidated. This manufacture is, however, essentially different from the present invention, because the action of an electro-negative element in a secondary cell is different from that of a primary cell, the oxidating material in the former not only being required to give up its oxygen to the hydrogen evolved at the surface of the element in discharging the cell, but also readily to reunite with oxygen when it is evolved in charging it. The two manufactures are also essentially different with regard to the effect which heat and pressure have upon the materials used in the two cases. Lead, as is well known, is fusible, weldable, and plastic, and the active material can by heat and pressure be united thereto without the aid of any foreign cementing substance, like resin. Lead oxide is also much less refractory in its nature than manganese dioxide. In the form of litharge it can be melted, as is well known.

The invention also consists in combining the active material with the conducting material by placing the former in recesses or receptacles in a block or ingot of the latter, and in then reducing the compound charge to the shape desired for the element by pressing out and spreading the said charge, so as to diminish its thickness and increase the surface-area.

The invention lastly consists in rolling together the materials composing the element, as well when the said materials are combined in the form of an ingot to be reduced by rolling as when they have substantially their final form, and also as well when the active material is combined with the supporting material as a surface-layer only, or is placed in recesses in or distributed through the mass of the conducting support as when it is combined with said support, both as a surface-layer and as, also, by being placed in recesses in the supporting material.

By "active material" is to be understood the lead oxide or other oxide, salt, or reducible compound or other material which is to become or to be converted into the electro-positive material of one element or the electro-negative of the other, or to be or become the active portion of an element that is to be used as a positive or negative indifferently, as the user may desire. By "supporting material" is to be understood the material constituting the body, frame, or support of the element or plate. It is ordinarily metal, and is preferably lead or some alloy or compound of lead.

The object of these several improvements is to secure the most perfect union, electrical and mechanical, of the active material with its support, together with the maximum of cohesiveness in the active material itself, combined with a sufficient degree of porosity to be readily acted on by the exciting-liquid.

The following is an example of the manner in which the invention is or may be carried out, the several improvements being embodied in one manufacture.

An ingot of lead is cast with grooves and perforations therein. These grooves and perforations are then filled with lead oxide, (preferably red lead or the puce-colored oxide.) The lead oxide may be forced into the receptacles if desired. The active material (lead oxide) is thus placed within the mass or ingot of the supporting material (metallic lead.) The surface is then covered with a layer of the lead oxide, and the whole is passed repeatedly between rolls until the mass or ingot is reduced to the desired dimensions. It is thus divided into pieces of the proper size. The plates or elements thus made are then ready to be "formed" and assembled in couples in a vessel containing a suitable electrolyte—such for example, as a ten per cent. solution of sulphuric acid in water. The mass or ingot is heated before or after the application of the lead oxide or active material. In the accompanying drawing is shown a cell of secondary battery containing two plates or elements made in accordance with the invention.

Each electrode consists of a body or frame of lead A (represented by the shaded portion) with compressed lead oxide (represented by the dotted portions) distributed throughout its mass, and a sheet, B, of compressed lead oxide pressed on its surface. The union of the active material (lead oxide) to the supporting material (lead) by pressure is illustrated by the extension of the dots into the shaded portion, the pressure acting in a measure to cause an interpenetration of the two materials.

The elements or plates may be simply placed side by side in the electrolyte, with suitable space between, as shown, or they may be otherwise disposed, as desired, the arrangement of them in the cell forming no part of the invention.

Modifications may be made in details without departing from the spirit of the invention, and parts of the invention may be used without others.

The description preceding that of the drawing, showing, by way of example, how the several parts of the invention may be embodied in one manufacture, is taken from the original specification of my application for improvement in secondary batteries filed April 14, 1882, and officially numbered 58,313, (the present application being officially numbered 99,164.) The drawing is an attempt to illustrate the structure of an electrode made as described.

No claim is made herein, broadly, to the application of active material to a conducting support to form an element of a secondary voltaic couple; nor to the use of lead oxide as the active material, as these and other general improvements of like nature are reserved to my said application No. 58,313.

Neither is any claim made herein, broadly, to the distribution of active material throughout the body of the support, such as would result from the mixing of the active material with the supporting material, (the latter being molten or plastic;) nor to the application of a surface-layer of active material to the support having active material so distributed throughout its mass, as this forms the subject-matter of my application filed September 12, 1882, and numbered 72,901, the same being a division of No. 58,313; but it is evident that such improvements might be used in carrying out the present invention, or a part thereof—as, for example, if an ingot made in that way be reduced by rolling or even by a pipe-press.

Neither do I claim herein, broadly, making a compound charge or ingot of the active and supporting materials, and then reducing the whole to the shape desired for the element to have, as this is reserved to my application filed May 13, 1882, and officially numbered 61,269; but if the active material be placed in recesses or perforations in the supporting material, or be mixed with the latter, and the compound charge be then pressed out, the process will embody a part also of the present invention, and so, also, if the reduction be effected by rolling, whether the active material be placed within the supporting material or on its surface.

Neither is any claim made herein to uniting the active material to the conducting-support by welding or casting, or in the manufacture of the latter, unless pressure be also employed, either in effecting the union or in consolidating the active material, the broad or general claims to the union of the active material to the conducting-support by welding or casting, or in the manufacturing of the support, being made in my application filed October 20, 1882, and officially numbered 74,757.

What I do claim herein is—

1. In the manufacture of secondary batteries, the improvement consisting in consolidating lead oxide to form the active material by heat and pressure, substantially as described.

2. In the manufacture of secondary batteries, the improvement consisting in uniting the active material to the supporting material or conducting-support of metal—such as lead—by heat and pressure, substantially as described.

3. The improvement in secondary batteries consisting in uniting a compressed layer of active material by the aid of heat and pressure to the supporting material or conducting-support of a metal—such as lead—which is softened by heat, substantially as described.

4. The improvement in secondary batteries consisting in combining the active with the supporting material by placing it within the said supporting material and reducing the compound charge to the shape desired for the element by pressing out and spreading the said charge, so as to diminish its thickness and increase the surface-area, substantially as described.

5. The improvement in secondary batteries consisting in combining the active material with the supporting material in the form of a compound charge or ingot, and then reducing by rolling the said charge or ingot to the form desired for the element, in contradistinction to reducing the same by pressure in an ordinary press or in a pipe-press, substantially as described.

6. The method of making the elements of secondary couples by combining active material with a heated ingot of supporting material, the active material being placed within the ingot and also on its surface, and then reducing the whole by rolling while heated, whereby the active material is consolidated by heat and pressure, and is by the same means united to the conducting-support, the compressed surface-layer being united to the compressed active material within the support, substantially as described.

7. The improvement in secondary batteries consisting in placing the active material in or on the conducting-support, and then rolling the active material into the conducting-support, substantially as described.

In testimony whereof I have signed this specification in the presence of two subscribing witnesses.

WM. ANTHONY SHAW.

Witnesses:
PHILIP MAURO,
C. J. HEDRICK.